Dec. 21, 1926.

O. F. RUSSELL 1,611,611

VALVE

Filed June 12, 1926

INVENTOR.

Patented Dec. 21, 1926.

1,611,611

UNITED STATES PATENT OFFICE.

OLIN F. RUSSELL, OF WATERMAN, CALIFORNIA.

VALVE.

Application filed June 12, 1926. Serial No. 115,649.

My invention relates to valves, and particularly to that class of valves used to stop the flow through branch or main pipes, and the objects of my improvements are:

First, to provide a neat, simple and economical valve to replace the more cumbersome cut-out cocks.

Second, to provide a valve which also takes the place of a union and may be installed in a pipe line without turning either of the pipes to which it is connected, and third to provide a valve which may be readily taken apart for inspection or to replace the removable valve seat.

Other objects and advantages will appear later in the specification and referred more particularly to in the claims.

Figure 1:
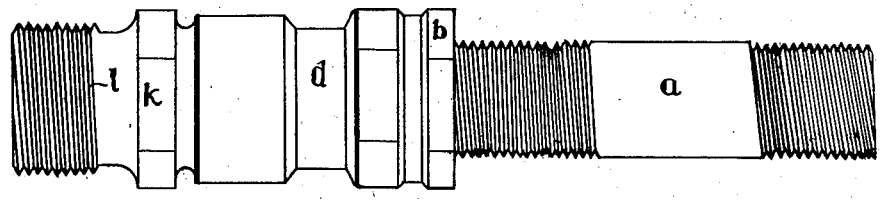

In the drawings, Figure 1 is a side elevation showing an external view of the complete valve.

Figure 2:
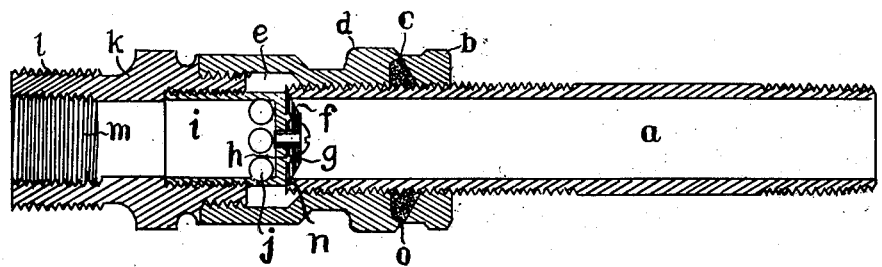

Figure 2 is a sectional view of the complete valve showing the interior of same.

As will be seen from the drawing this valve has no handle and it normally remains in an open position. It is closed only when it is desired to stop the passage of water, steam, oil, gas, air, etc., through the pipe, as for instance when making repairs beyond this point in the pipe line.

The same reference letter refers to similar parts in both views, (a) being the nipple, (b) the packing and jam nut, (c) the packing, (d) the middle member provided with a chamber (e), (f) is the valve washer provided with detents (g) which receive the lugs (h), (i) is a removable member to which the washer is secured. It is provided with a plurality of openings (j) to permit the passage of contents when the valve is open.

(k) is the end member to which the valve washer-holder (i) is secured, (l) is the outer thread and (m) the inner thread in the end member (k).

This valve was designed primarily as an interior fitting where neatness and compactness are essential, it having no protruding valve or valve-stem and handle and it also eliminates the dripping so common in cut-out cocks and valves of the stem and handle type.

The valve is installed as a union for connecting two pipes by first backing away the jam-nut (b) and the middle member (d) to the right in the drawing as far as they will go, then connecting nipple (a) to one pipe and the end member (k) to the other pipe by screwing the main part of the valve outward on the nipple and at the same time onto the pipe, this opens the valve by moving the valve washer (h) away from the seat (n) in the nipple (a), the jam nut (b) is then tightened against the packing (c).

When the valve is open the contents flows past the valve seat (n) and washer (g) into chamber (e) then back through the ports (j) into the pipe.

To close the valve the jam nut is first backed off and the valve screwed onto the nipple until the valve washer (g) seats on the valve seat (n) which shuts off the passage.

The packing means is provided with an over-hanging lip (o) which meets the outer point of the flange on the packing nut (b) thereby obscuring the packing (c) from view. The packing nut (b) also acts as a jam or lock nut.

A feature of great advantage is the ease with which this valve may be opened for inspection or repair which is accomplished by backing away the jam nut and unscrewing the middle member (d) from the end member (k).

The washer holder (i) in which the ports (j) are provided may carry a washer (f) or it may be one solid piece having no washer, in which case the joint would be ground.

I do not wish to be limited to the details of construction or use herein set forth, but reserve the right to change, modify, or vary the construction within the scope of this invention.

Having thus described my invention, what I claim and desire to secure by Letters Patent, is—

1. A valve comprising a nipple having a long running thread one end of which forms a valve seat, and end member internally and externally threaded at each end, an internal annular valve member provided with a plurality of ports and carrying a removable ground valve or washer and a detent provided between the valve or washer and its holder, an intermediate annular member provided with a chamber forming a by-pass around the end of said valve member when open and an annular lip formed on one end of said intermediate member and a packing nut to co-operate therewith to enclose a packing.

2. In a device of the class described, in combination with a nipple having a ground seat, of a valve member provided with one or more detents to engage a washer and prevent same from turning with reference to the valve member, a packing member provided with an overhanging lip, a packing and jam nut having a beveled flange, and both packing member and packing nut mounted on a traveling thread on the nipple.

3. In a device of the class described, in combination; a nipple provided with a relatively long threaded portion on the end of which is provided a valve seat, an intermediate member having internal threads at both ends, the inside diameter of a part of which is relatively larger than the other part to form a bypass around the end of the valve holder, a removable ground valve head, an internal valve member being partially hollow provided with a plurality of ports in the lateral wall thereof and an end member to which said valve and intermediate members are connected.

4. In a device of the class described, in combination with a nipple having a long thread, a packing nut, packing and a middle member mounted on said threaded part of the nipple, a valve member provided with one or more ports, a washer secured to said member and held from turning on same by means of detents, a by-pass around the end of said valve member when same is open, and an end member provided with an outer and inner threads.

In testimony whereof I affix my signature.

O. F. RUSSELL.